United States Patent
Ciscon et al.

(10) Patent No.: US 10,189,205 B1
(45) Date of Patent: Jan. 29, 2019

(54) PRINTER HEAD Z-AXIS ALIGNMENT METHOD AND SYSTEM

(71) Applicant: NORTHWORKS AUTOMATION, INC., Houston, TX (US)

(72) Inventors: Lawrence Ciscon, Houston, TX (US); James D. Wise, Houston, TX (US)

(73) Assignee: NORTHWORKS AUTOMATION, INC., Houston, TX (US)

( * ) Notice: Subject to any disclaimer, the term of this patent is extended or adjusted under 35 U.S.C. 154(b) by 0 days.

(21) Appl. No.: 15/659,433

(22) Filed: Jul. 25, 2017

(51) Int. Cl.

| | |
|---|---|
| *B29C 64/393* | (2017.01) |
| *B33Y 30/00* | (2015.01) |
| *B29C 64/209* | (2017.01) |
| *B29C 64/232* | (2017.01) |
| *B33Y 50/02* | (2015.01) |
| *B29C 64/112* | (2017.01) |
| *B29C 64/106* | (2017.01) |
| *B29C 64/386* | (2017.01) |

(52) U.S. Cl.
CPC .......... *B29C 64/393* (2017.08); *B29C 64/209* (2017.08); *B29C 64/232* (2017.08); *B33Y 30/00* (2014.12); *B33Y 50/02* (2014.12); *B29C 64/106* (2017.08); *B29C 64/112* (2017.08); *B29C 64/386* (2017.08)

(58) Field of Classification Search
CPC ... B29C 64/393; B29C 64/232; B29C 64/209; B29C 64/112; B29C 64/386; B29C 64/106

USPC .................. 425/375; 264/40.1, 308
See application file for complete search history.

(56) References Cited

U.S. PATENT DOCUMENTS

| | | | |
|---|---|---|---|
| 6,164,753 A | 12/2000 | Maza et al. | |
| 9,085,109 B2 | 7/2015 | Schmehl et al. | |
| 9,314,970 B2 | 4/2016 | Elsworthy | |
| 9,481,133 B2 | 11/2016 | Carbone et al. | |
| 2010/0100224 A1* | 4/2010 | Comb .............. | B33Y 40/00 700/118 |
| 2017/0144379 A1* | 5/2017 | Sung .............. | B29C 67/0088 |

* cited by examiner

*Primary Examiner* — Seyed Masoud Malekzadeh
*Assistant Examiner* — Lawrence D. Hohenbrink, Jr.
(74) *Attorney, Agent, or Firm* — Timothy J. Bechen; Bechen PLLC

(57) ABSTRACT

A 3D printer calibration system and method includes a controller controlling movement of the 3D printer printhead in a first axis, such as the z-axis. The printhead includes a hotend for depositing material to generate the 3D printing. The hotend is connected to the printhead via a connector being moveable along the first axis. The hotend further includes an arm that extends outward from the side of the hotend. An optical sensor assembly is affixed to the printhead, the optical sensor assembly that has a light emitter and a light detector. The controller calibrates a starting position for the printhead based on the first axis deflection of the hotend as detected by the optical sensor assembly. The connector allowing first axis deflection of the hotend distinct from the first axis movement of the printhead.

5 Claims, 5 Drawing Sheets

PRINTER HEAD Z-AXIS ALIGNMENT METHOD AND SYSTEM

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent files or records, but otherwise reserves all copyright rights whatsoever.

FIELD OF INVENTION

The disclosed technology relates generally to three-dimensional (3D) printer printhead alignment technology and more specifically to determining 3D printer printhead axis position, including a z-axis position.

BACKGROUND

The position of the printhead in 3D printing is critical. Additive deposition printing in three dimensions requires exact knowledge of all axis points, typically derived from a starting base location, e.g. home location. Where x-axis and y-axis positions can be determined by gearing positions of the printing assembly, the z-axis provides a significant challenge because it is measured off the printbed on which the 3D object is printed.

For proper calibration, the distance between the printbed and the printhead should be known within 5-10 microns. This distance ensures proper part adhesion. Current techniques for this distance calibration are both unreliable and cumbersome.

A first technique is a micro-switch or mechanical sensor. A carriage mechanism mechanically engages or presses into a switch, where the contact information is usable for determining the z-axis position. The mechanical sensor requires complex mechanical coupling operations and is prone to failure. This technique can be unreliable over long-term operations. Moreover, this technique requires precise installation, thus complicating operations when replacing or swapping out printheads.

A second technique uses an optical sensor disposed at a fixed location within the 3D printer system, such as along an outer track. When determining a starting or home position, the printhead assembly is moved in the various directions until a light beam shone across the printbed is interrupted. This technique is costly as well as unreliable due to printhead sizing variations, especially in view of the optimized z-axis range being within 10 microns.

A third technique is using a near-field sensor, such as a Hall effect sensor. The near-field sensor requires a clean metal surface. Similar to the first technique, this approach can be unreliable, including the metal surface not being clean enough. Also, this technique requires manual calibration of the vertical distance between the sensor and the hotend tip. Thus, replacing or swapping out printheads becomes time-consuming.

It is also widely known that one can use optical sensors for print head positioning, such as U.S. Pat. No. 6,164,753. This technique applies to inkjet printing done primarily in a single axis. The optical sensor in this technique determines a starting point solely for moving the inkjet printhead along the x-axis, as the paper is fed past the printhead.

As such, there exists a need for a system and method to properly calibrate the z-axis position of a 3D printer printhead, more specifically for the positioning of the hotend of the printhead relative to the printbed using a reliable, repeatable technique that allows for printhead replacement.

BRIEF DESCRIPTION

A 3D printer calibration system and method includes a controller controlling movement of a 3D printhead, the movement control including defining a starting point in a first axis, such as the z-axis. The printhead includes a hotend for depositing material to generate the 3D printing. The hotend is connected to the printhead via a connector, the printhead being moveable along the first axis. The hotend further includes an arm that extends outward from the side of the hotend. The calibration system includes an optical sensor assembly that has a light emitter and a light detector. The optical sensor assembly is affixed to the printhead. Therefore, the controller calibrates a starting position for the printhead based on the first axis deflection of the hotend as detected by the optical sensor. The first axis deflection is movement of the hotend in the first axis distinct from the first axis movement of printhead.

The connector of the 3D printer calibration system can be any mechanism that provides precise linear motion with an elastic deflection element. For example, the connector of the 3D printer calibration system can be a flexure. Or, in another example, the connector of the 3D printer calibration system may be a linear rail with an elastic deflection element, such as a spring.

The optical sensor assembly includes a light emitter, such as a diode. The arm of the hotend partially occludes the light from the emitter prior to hotend deflection. Deflection of the hotend displaces the arm increasing the light to the detector. The optical sensor, upon detection of change in the light, informs the controller that the printhead has passed a zero point in the first axis.

The optical sensor assembly is disposed on the printhead. The proximity improves accuracy in deflection detection, improving first axis positional awareness. Output voltages from the optical sensor are measured with an analog circuit enabling high resolution detection of minute deflections. The optical sensor assembly allows for position detection within 10 microns or less.

The printer calibration system further includes a connecting mechanism for connecting the printhead to the mounting assembly. The connecting mechanism provides for ease of swap or replacement of the printhead allowing for automated recalibration of the first axis, as necessary.

A better understanding of the disclosed technology will be obtained from the following detailed description of the preferred embodiments taken in conjunction with the drawings and the attached claims.

DETAILED DESCRIPTION

Figure 1A:
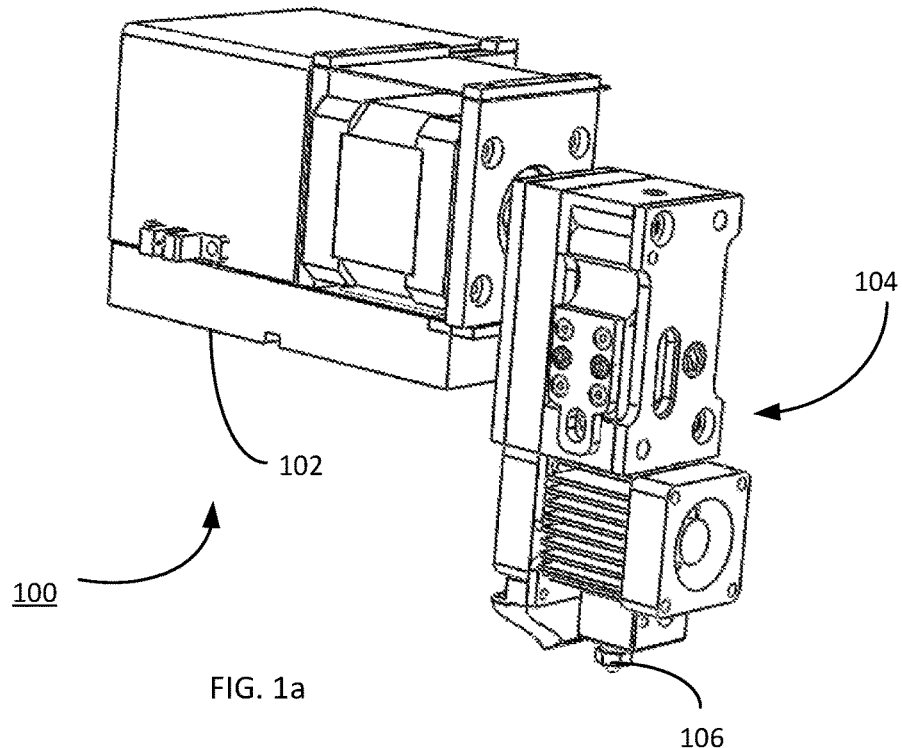
FIGS. 1a and 1b illustrate perspective views of a 3D printer printhead having the position calibration system therein.

FIG. 1a illustrates a perspective view of a 3D printhead 100 capable of using the position calibration functionality as described herein. The printhead 100 is disposed within a 3D printer using known 3D printer technology, whereby the printhead 100 is modifiable for including functionality providing for z-axis position precision not previously available.

The printhead 100 includes a controller 102 and a hotend 104 with a deposition head 106 directly below a heating block 108. The controller 102 controls operation of the hotend 104 and feeding filament (not shown) through the hotend 104. In accordance with known techniques, the hotend 104 heats deposition material using the heating block 108, wherein the head 106 deposits the material for 3D printing.

The printhead 100 operates using known deposition techniques for 3D printing, whereby the inclusion of the proposed alignment system improves z-axis precision to several microns. It is recognized the printhead 100 is connected to a 3D printer system including mechanical components for determining x, y axis positions using known techniques. The 3D printer and printhead 100 are controlled by printing instructions for controlling the timing, position and deposition rate of material for generating a 3D print output. In one embodiment, the hotend 106 may be the E3Dv6 hotend available from E3D-Online Lmtd, United Kingdom.

As described in further detail below, a connector allowing for z-axis displacement of the hotend connects the hotend to the printhead. Furthermore, the hotend includes an arm that extends into an optical sensor assembly affixed to the printhead.

Figure 1B:
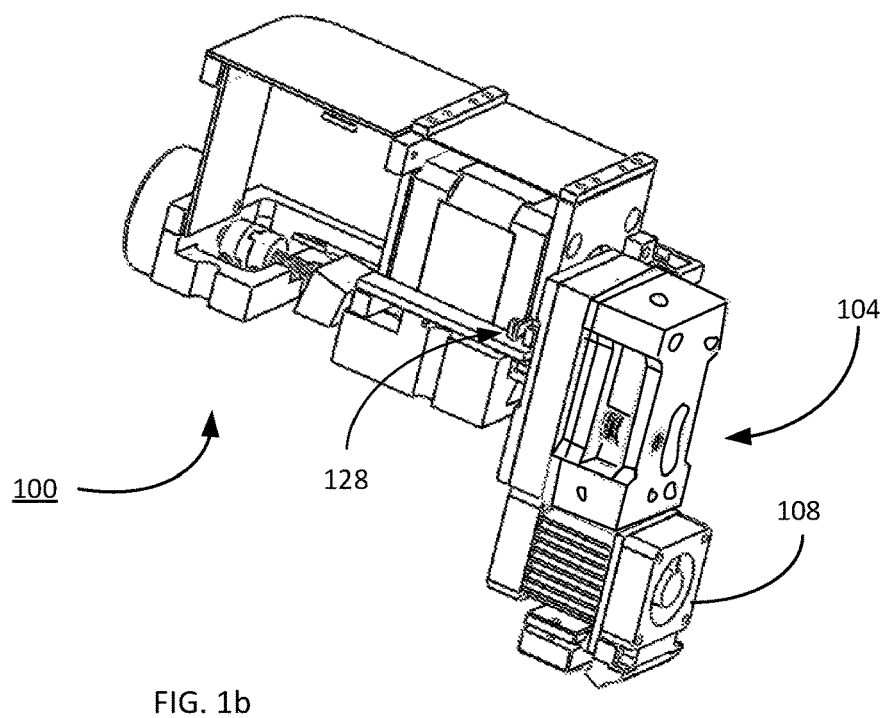

In FIG. 1a, the z-axis displacement detection element is not visible. Whereas, FIG. 1b illustrates a different perspective view. The printhead 100 includes the hotend 104, heating block 108 with the elements of the printhead 100. An optical sensor assembly 128 is disposed between the hotend 104 and the printhead 100, the optical sensor assembly 128 described in further detail below.

Figure 2:
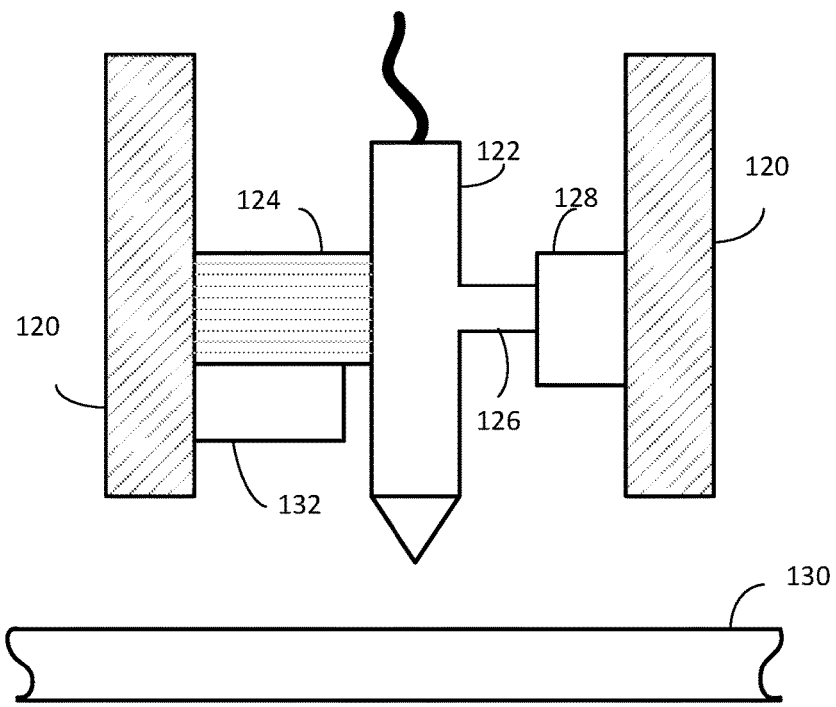
FIG. 2 illustrates a side view of one embodiment of a printhead within the calibration system.

FIG. 2 illustrates a front view of an assembly including a printhead 120 and a hotend 122 attached to the printhead 120 via a connector 124. The hotend 122 includes an arm 126 that extends outward from the hotend 122. The assembly includes an optical sensor assembly 128.

The printhead 120 is positioned over the printbed 130. 3D printing is performed by the deposition of material onto the printbed 130 through the hotend 122 of the printhead 120 after the accurate z-axis position determination. Further illustrated in FIG. 2, a preload stop 132 extends out from the printhead 120, engaging a bottom end of the connector 124 at the point of contact between the hotend 122 and the connector 124. The preload stop 132 also provides for maintenance of any preload tension in the connector 124.

Figure 3:
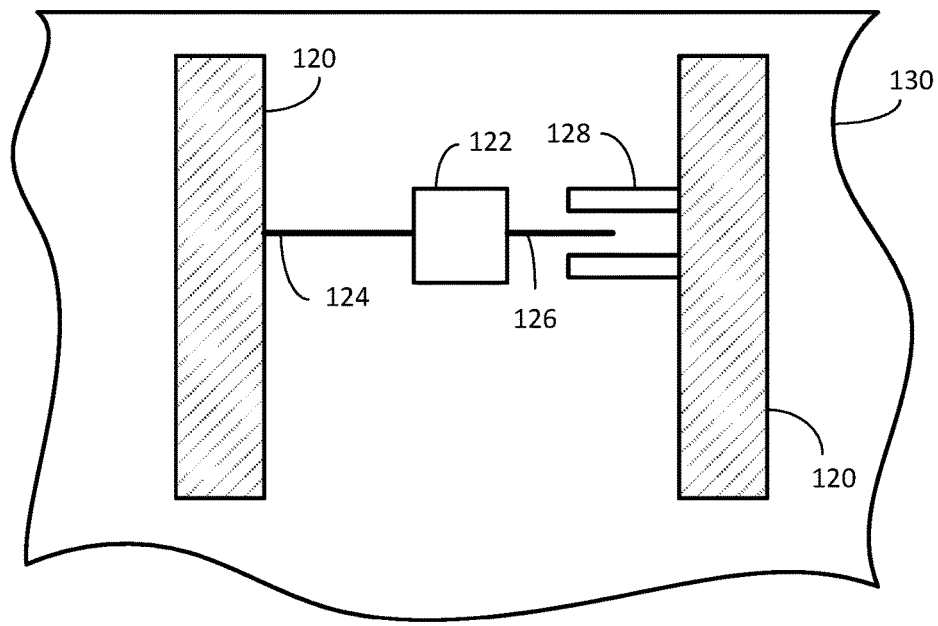
FIG. 3 illustrates a top view of one embodiment a printhead within the calibration system.

For further illustration of the operation of the assembly, FIG. 3 illustrates a top-down view of the printhead 120 over the printbed 130. The connector 124 extends out from the printhead 120 to hold the hotend 122 over the printbed 130. The arm 126 extends into the optical sensor assembly 128.

While not readily visible, the optical sensor includes a light emitter and a light detector. The emitter is disposed on one side of the sensor assembly 128 and the detector on the other. Unless the hotend 122 is deflected as part of the calibration, the arm 126 partially blocks the emitted light from the detector. The arm 126 is positioned between the emitter and detector and the detector such that the detector receives a small amount of light.

In the above embodiment, the connector 124 may be a flexure assembly. The flexure is flexible in the z-axis plane relative to the printbed 130, and is stiff in the x and y axes. The connector 124 provides enough flexibility to ensure the hotend 122 can be displaced when the hotend 122 touches the printbed, but also have enough rigidity to insure no unwanted movements during printing operations. For example, in one embodiment a stop member (not shown) connected to the printhead may preload a force against the connector 124 with enough force sufficient to prevent upward motion during normal printing operations, but small enough that the hotend 122 may be moved upward to trigger the sensing process without causing damage. The preload stop 132 engages the connector 124 at the point of contact between the connector 124 and the hotend 122. As the connector allows z-axis movement of the hotend 122, the stop 132 ensures the hotend 122 does not extend lower in the z-axis during the initialization phase, as well as during normal operations, but instead secures the proper z-axis position for the hotend 122.

Prior to beginning printing operations, the printhead 120 must determine a home position, with specific requirements to the z-axis position, dictating the spacing between the hotend 122 and the printbed 130.

Figure 4:
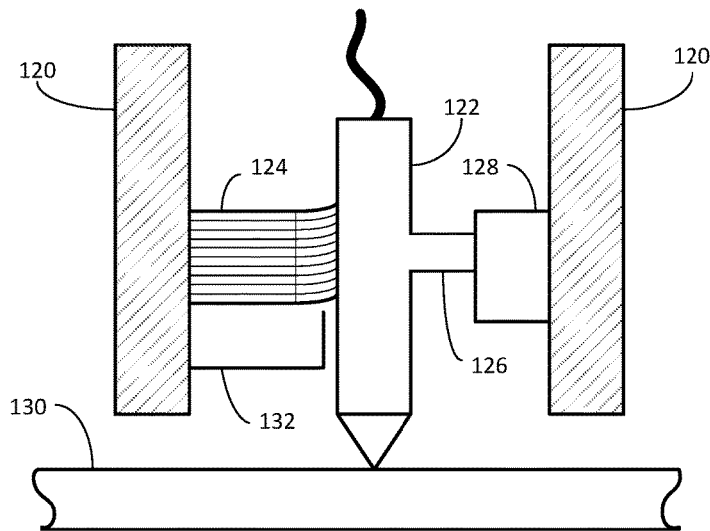
FIG. 4 illustrates a side view of one embodiment of the printhead with the hotend in contacting engagement with a printbed.

FIG. 4 illustrates printhead 120 movement for z-axis calibration. The 3D printer moves the printhead 120 and hotend 122 close to the printbed 130. When the hotend 122 engages the printbed 130, the printhead 120 is able continue moving in the z-axis direction, but the hotend 122 cannot because its movement is being resisted by the printbed 130. As the printhead 120 moves downward, the connector 124 absorbs the z-axis deflection without damaging the hotend 122.

The connector 124, in this embodiment being a flexure, flexes upward as the hotend 122 remains stationary relative to the printbed 130. As the optical sensor assembly 128 is affixed to the printhead 120, its position does not change relative to the printhead 120. Rather, as the movement of the hotend 122 is stopped by the printbed 130 and the printhead 120 (and sensor assembly 128) continue to move downward, the position of the arm 126 is displaced within the sensor assembly 128. As the arm 126 is within the sensor assembly 128, the change in position of the arm 126 relative to the assembly 128 allows for the arm 126 to increase the amount of light that passes from the emitter to the detector. Also visible, the connector 124 is no longer in contacting engagement with the stop 132.

The hotend displacement distance relates to the z-axis measurement precision. In one embodiment, the displacement distance is approximately 5 microns for determining z-axis position within a precision of 5 microns. The present technique for detecting change in voltage provides that even a very small change in the position of the arm 126 obstructing the light path causes a measurable change in voltage. As described in further detail below, the analog measurement of voltage change makes this detectable.

It is recognized that the above exemplary embodiment of 5 micron movement is not limiting in nature. The detector is partially occluded from the emitter by the arm 126 because full occlusion introduces distance error that may be unaccounted for. For example, if the light is full occluded and the arm moves 10 microns with the light still occluded, those 10 microns of movement cannot be detected. Therefore, partial occlusion allows for an alignment position and the z-axis deflection reduces the amount of occlusion causing a change in light passing to the detector and thus a change in detector voltage. Moreover, it is recognized that the partial occlusion and change in light passing to the detector may also be a downward change in light, such that movement of the arm increases the amount of occlusion again creating a voltage change.

As used herein, axial movement is relative. In the example of z-axis movement, the movement of the printhead is relative to the printbed. For example, one embodiment may include printbed movement where the printhead is stationary. In another embodiment, the printhead may be moved and the printbed is stationary. It another embodiment, both the printhead and the printbed may be moved. Therefore, the herein described z-axis movement of the printbed is relative to the printhead and vice versa such that measurable z-axis displacement occurs and the z-axis movement is not expressly limited to solely moving the printhead.

In FIG. 2 the arm 126 partially occludes the light from the emitter. Whereas, in FIG. 4, when the connector 124 allows for z-axis movement of the hotend 122 due to the hotend 122 touching the printbed 130, the movement of the arm 126 allows the light source to pass to the light detector within the optical sensor assembly 128. The detector is then able to detect more of the light from the emitter because the arm 126 has been displaced by the hotend 122 engaging the printbed 130 and the connector 124 allowing the z-axis displacement.

As the optical sensor assembly 128 detects the change in light, the assembly now knows the exact position of the printhead 120 relative to the printbed 130, and by virtue then knows the exact z-axis position.

In one embodiment, the optical sensor assembly 128 includes an analog to digital converter (ADC) disposed directly within the assembly holding the printhead 120. The proximity of the ADC significantly increases the axis position accuracy based on the response time for processing the detection of the light source. It is recognized that alternative embodiments may provide for alternative placement of the ADC whereby connectivity provides for reduction or elimination of signal degradation from transmission.

As the arm 126 moves and allows more of the light to pass from the emitter to the detector, the detector will begin light recognition by a voltage increase. The present invention utilizes these low level voltage increases to detect minute movements by the printhead. The proximity of the embedded detection circuitry disposed within the printhead assembly further improves the minute movement detection because the low voltage level detection does not suffer signal degradation due to signal transmission, as compared to signal degradation from sending a signal to a controller, also referred to a controller board, or an offsite converter.

As the voltage level increases the optical sensor assembly performs complex processing to filter and measure the output to detect change, and generates a digital signal to notify the controller that the hotend is in contacting engagement with the printbed.

Due to the required precision of the z-axis position, the position of the light sensor 162 and ADC 166 within the assembly 164 allows for z-axis position detection within 10 microns, including precision within a range of 1-5 microns. Unlike the prior art techniques for optical recognition for printhead positioning, positional accuracy is achieved by including circuitry elements in close proximity to the printhead 120.

Figure 5:
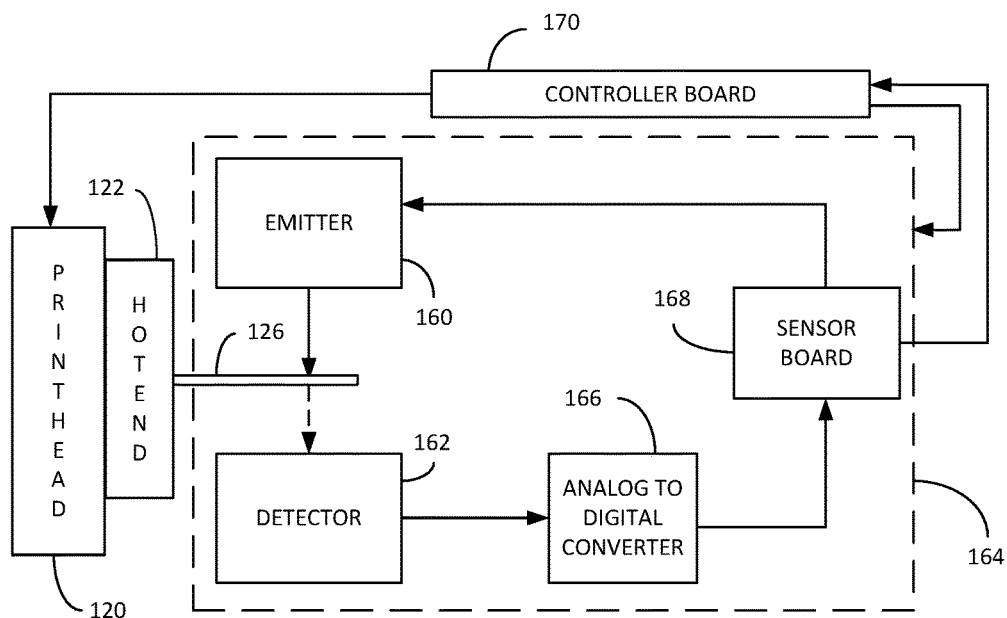
FIG. 5 illustrates a circuit diagram of one embodiment of controller.

FIG. 5 illustrates an operational diagram of the z-axis calibration, including an emitter 160 and a detector 162, which are part of an optical sensor assembly 164. The assembly 164 further includes an analog to digital converter 166 and a sensor board 168.

A controller board 170 controls positional operations for the printhead 120, thus also moving the hotend 122. Also shown for illustration of operational features, the arm 126 extends out from the hotend 122 between the light source 160 and sensor 162.

Illustrated in FIG. 5, two arrows extend between the emitter 160 and detector 162, indicating two operational stages: a first stage when the light is partially occluded by the arm 126; and a second stage when the arm 126 is displaced and increased light reaches the detector 162.

The emitter 160 may be any suitable type of light source capable of providing a directed beam of light. In one embodiment, the emitter is a light emitting diode consistent with known optical sensor technology, but it is recognized that any suitable light source may be utilized. Similarly, the detector 162 may be any suitable type of light sensor as recognized by one skilled in the art, where the light sensor generates an analog voltage output based on the amount of light detected.

It is recognized that any suitable electronic components may be utilized for performance of the operations described herein. By way of example, but not expressly limiting, the light may be an LED, disposed in a photointerrupter RPI-0352E available from Rohm Semiconductor.

Figure 6:
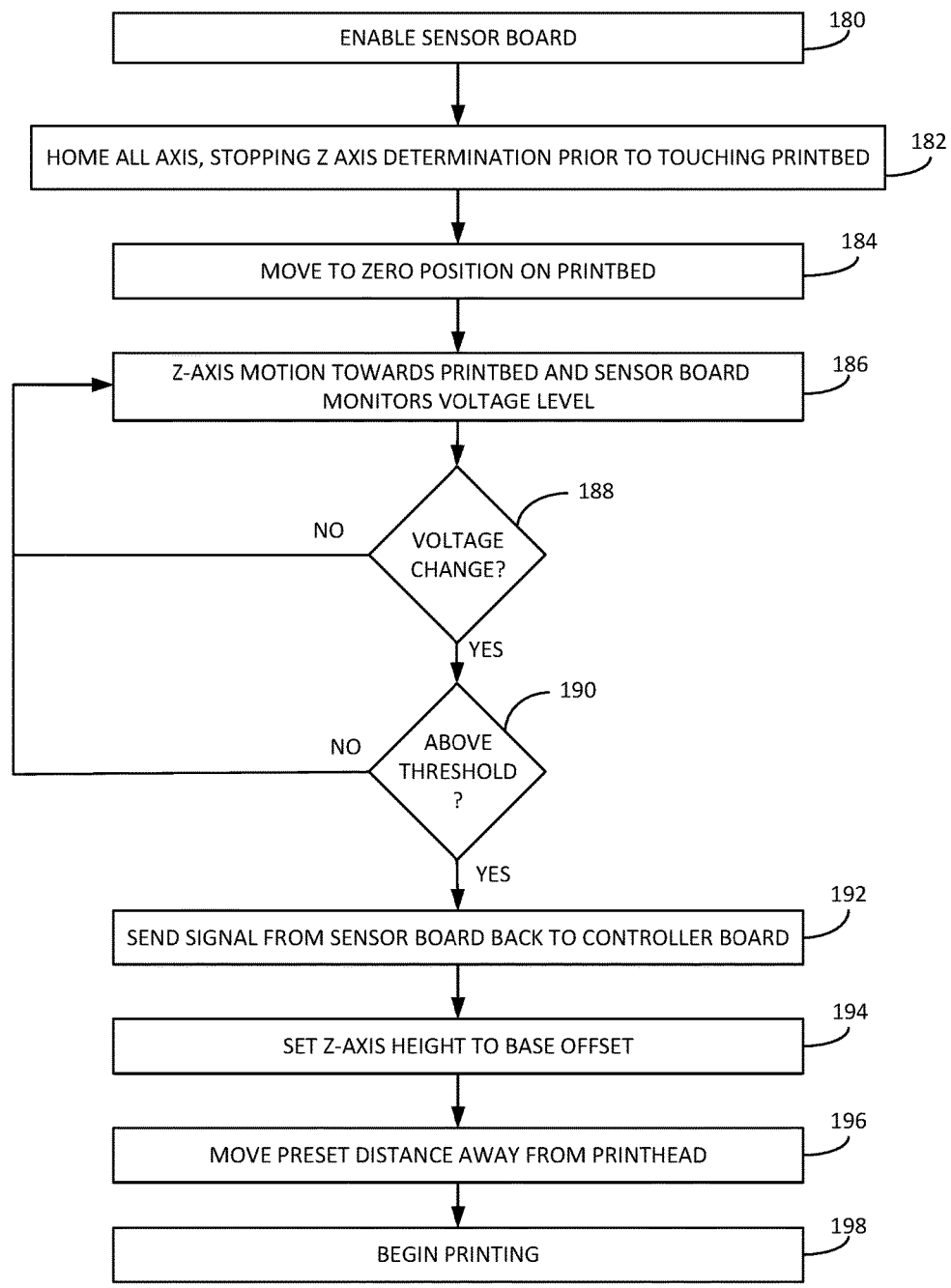
FIG. 6 illustrates a flow diagram of one embodiment for calibration and positioning on the printhead relative to the printbed in the z-axis.

FIG. 6 illustrates the operation of the diagram of FIG. 5 for z-axis calibration. A first step, step 180, is to enable the sensor board. In FIG. 5, the controller board 170 enables the sensor board 168 to turn on the emitter 160. In this step, as the arm 126 partially blocks the light from reaching the detector 162, the detector 162 provides a small voltage output and the converter 166 generates an output representing the null state of the hotend.

Step 182 is for the controller to home all axis, stopping z-axis determination prior to touching the printbed. The step may be performed using known techniques for finding general home locations in 3D printers, including accurately determining the x-axis home location and the y-axis home location. The z-axis home location is not yet determined, but a proximate or safe position is determined to ensure the hotend does not improperly contact the printbed.

Step 184 is to move to the zero position on the printbed. This places the printhead into an x-axis position of zero, y-axis position of zero and an estimated z-axis position to be refined using the remaining operational steps.

Step 186 is to provide z-axis motion towards the printbed, where the sensor board monitors voltage levels. As illustrated in FIG. 5, the controller board 170 moves the printhead 120 (and hotend 122) towards the printbed (not illustrated). For clarity, as the optical sensor assembly 164 is in close proximity to the printhead 120, such as affixed thereto, the assembly 164 is concurrently moved closer to the printbed. In one embodiment, the elements of FIG. 4 move as a single unit in the z-axis plane until the printbed 130 deflects the hotend 122.

As noted above, the z-axis motion is relative motion between the printhead and printbed. Therefore, step 186 may also be z-axis motion of the printhead towards the printbed.

In the flow diagram of FIG. 6, step 188 determines if there is a change in voltage detected by the detector 162. As the arm 126 moves up and out of the way, the light beam from the emitter 160 causes the sensor voltage 162 to increase. In step 188, if the voltage change is not detected, the arm 126 still occludes the same amount of the light source, as such the process reverts to step 186 to continue z-axis movement towards printbed 130.

In step 188, if a voltage change is detected, the amount of light being received at the detector 162 has changed and the method proceeds to step 190. Step 190 is a further determination step of determining if the amount of voltage change is above a threshold. If no, the method again reverts to step 186. Whereas if a threshold value is exceeded, this means that the arm 126 has enough z-axis displacement for recognizing the minute movements of the hotend 122 relative to the printhead 120, the method continues to step 192.

Step 192 is sending a signal from the sensor board back to the controller board. In FIG. 5, the controller board 170 receives the signal from the sensor board 168 indicating that the threshold value has been reached, which means termination of z-axis movement of the printhead 120 towards the printbed. Step 194 is to thus set z-axis height to a base offset, the base offset having just been determined by the preceding steps. The base offset can be determined within a range of several microns due to the high degree of accuracy of the sensor and analog to digital converter.

Step 196 provides for moving the printhead to a preset distance away from the printbed and continues to step 198 to begin printing. Therefore, the z-axis position being accurate within several microns ensures proper 3D printing.

Additionally, the automated calibration ensures proper z-axis determination with replaceable or removable printheads. Where existing calibration techniques require manual re-calibration due to variations in printhead technology, the present invention allows for the ease of printhead replacement without requiring manual calibrations.

The present method and system further provides for operational benefits outside of initial calibration operations. The method and system allows for detection and prevention of the printhead making inadvertent contact with the printbed or existing deposition material. For example, it is recognized that a printbed may not be uniform, including minor surface variations. It also compensates for the thermal growth, which is an inherent problem with fused deposition modeling (FDM) printers. Thus, during normal printing operations, the arm may continue partial occlusion of the light from the emitter such that any change in emitter voltage indicates the printhead has made contact, displacing the arm. Therefore, the controller may operatively monitor the detector output during print operations for prevention of inadvertent contact of the printhead, such as with the printbed or any other elements in the 3D printing operations.

The hotend mechanism is attached to the printhead using a modular fixture allowing quick replacement of the hotend for different conditions. This consists of alignment pins to ensure repeatable positioning combined with set screws to hold the hotend in place. Because the calibration system described herein is independent of the relative component lengths, a new hotend can be swapped out without necessitating any changes or adjustments to the calibration process.

Figure 7:
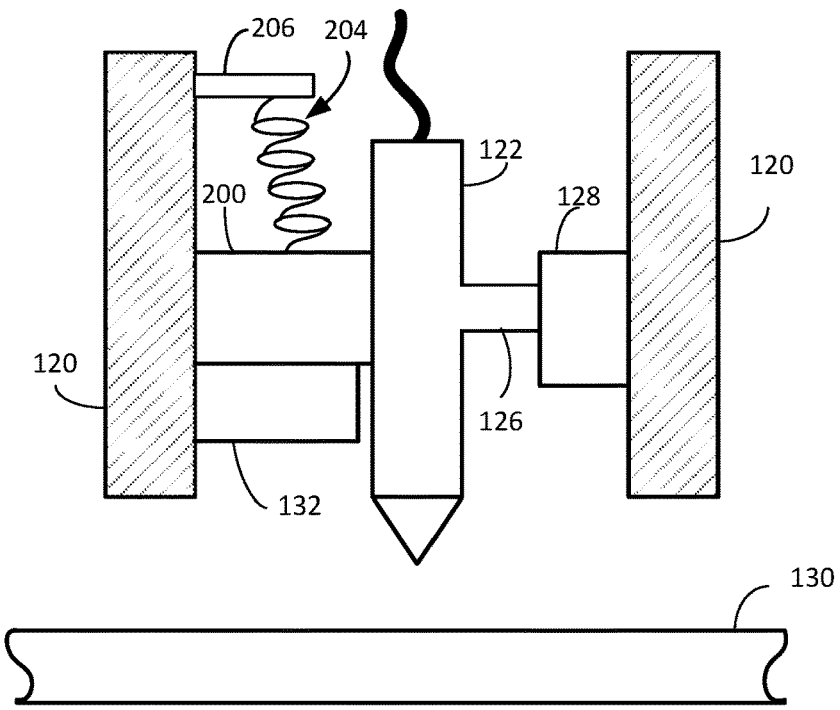
FIG. 7 illustrates an alternative connector connecting the hotend to the printhead.

FIG. 7 illustrates a further embodiment of an axis position calibration system. Similar to the embodiment of FIG. 2, the present system includes a printhead 120 with a hotend 122 attached using a connector. In this embodiment, the connector is a lateral rail 200 including a spring mechanism 204 allowing for movement in the z-axis relative to the printbed 130. The spring 204 is connected to an arm 206 attached to the lateral rail 200. The preload stop 132 further engages the connector 200 at the point of contact between the connector 200 and the hotend 122 to prevent improper z-axis downward deflection.

The z-axis deflection thereby provides for movement of the arm 126 extending into the optical sensor 128. Similar to the FIG. 2 embodiment, as the connector 200 is displaced in the z-axis, the arm 126 moves with respect to the beam and allows for the detector to sense a change in the amount of light.

Figure 8:
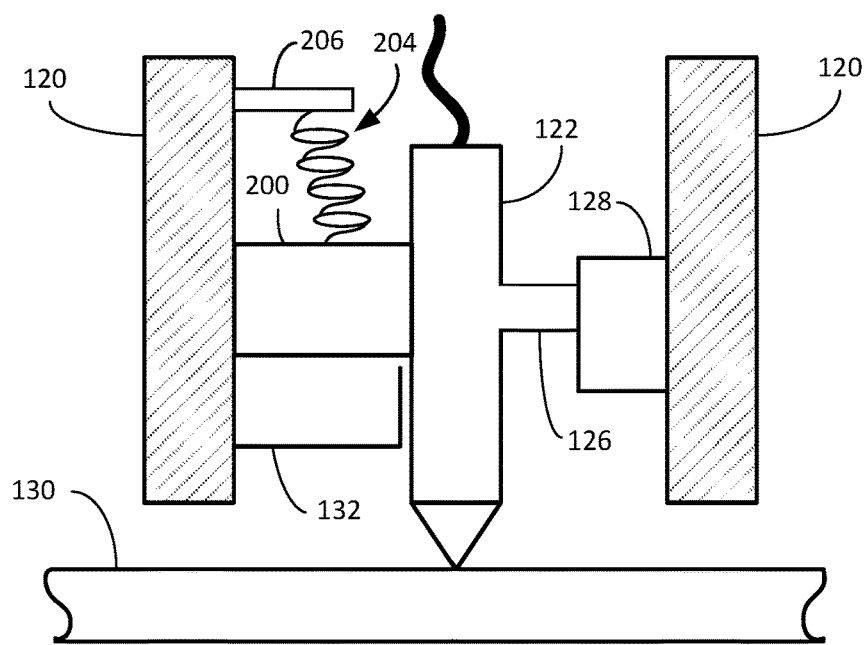
FIG. 8 illustrates the alternative connector with the hotend in contacting engagement with the printbed.

For further illustration of the z-axis position detection, FIG. 8 illustrates the hotend 122 in contacting engagement with the printbed 130. When engaged, the lateral rail 200 moves upward, the spring 204 compresses, and the arm 126 moves upward within the optical sensor 128. Also visible in FIG. 8, the lateral rail 200 is no longer in contact with the stop 132. As described above, the upward movement of the arm 126 allows for the optical beam to be detected by the detector.

Where FIGS. 7 and 8 illustrate an alternative embodiment, it is recognized that the lateral rail 200 may be any suitable displacement means capable of providing axial displacement. The connector allows for rigidity in the x-axis and y-axis, relative to the printhead, but for displacement in the z-axis. Therefore, the present embodiments illustrated herein are exemplary in nature, but not expressly limiting, as further embodiments as recognized by one skilled in the art are encompassed herein.

As such, the present system and method provides for accurate axis position detection of a 3D printhead using an optical sensor embedded within the printhead. The proximity of the optical sensor to analog to digital converter circuitry allows for detection of minute variations in axial movement. Moreover, the utilization of a displacement means allows for axial movement of the hotend distinct from the printhead when the hotend is in contact with the printbed. Thereby, the method and system provide a high degree of axial position accuracy within a range of several microns.

As noted above, the proximity of the embedded detection circuitry disposed within the printhead assembly further improves the minute movement detection because the low voltage level detection does not suffer signal degradation due to signal transmission. Whereas, it is recognized that further embodiments are within the present scope providing for other signal transmission means that overcome signal degradation. For example, one embodiment may include using an optical signal transmission system transmitting the analog signal to an A/D converter disposed exterior to the printhead assembly, e.g. along a fiber optic path. Therefore the proximity of the detection circuitry can be adjusted when accounting for any signal degradation occurring because of signal transmission(s).

The present system and operational method provide for improved z-axis position determination previously unavailable from prior art techniques. The herein described method and system provides for precision within 10 microns, including precision within a range below 5 microns. It is recognized that the present precision range of 10 microns provides a general range and is not expressly limiting. For example, the precision may be determined within a distance larger than 10 microns, where the quality or accuracy of the system elements may be adjusted, such as the accuracy of the light sensor, the threshold value level of the analog to digital converter, the accuracy of the gearing of the printer assembly for making z-axis position changes, etc. Therefore, the present method and system improves z-axis position within a precision level of 10 microns or less, but is not expressly limited to operating within the 10 micron or less range.

It is further recognized that the achievable precision in position detection depends on a number of factors. The physical resolution depends on the minimum detectable change in voltage. For example, a sensor aperture of 1 mm and a 10 bit A/D converter can achieve a 1 micron resolution. However, if noise in the system is greater than the A/D step size, the achievable resolution increases. Thus, filtering reduces noise at the expense of a slower response.

FIGS. 1 through 8 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, Applicant does not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein.

What is claimed is:

1. A z-axis calibration system for a three-dimensional printer comprising:
    a controller determining a zero position for a three-dimensional printer printhead in an x-axis and a y-axis, as well as finding an initial position for position of the printhead in the z-axis;
    a hotend of the printhead for deposition of printing material, the hotend connected to the printhead via a connector moveable in the z-axis, the hotend including an arm extending outward therefrom;
    an optical sensor assembly including an emitter and a detector, the optical sensor assembly directly affixed to the printhead, where at the initial position in the z-axis, the arm of the hotend extends in-between the emitter and the detector; and
    wherein the controller calibrates a starting position for the printhead based on z-axis movement of the printhead distinct from the hotend as facilitated by the connector, causing z-axis displacement of the arm on the hotend, the z-axis displacement allowing the detector to detect a change in light from the emitter.

2. The system of claim 1, wherein the printhead is a deposition printhead.

3. The system of claim 1, wherein the connector is at least one of: a flexure assembly and a linear rail including a spring element.

4. The system of claim 1, wherein the starting position between the printhead and a printbed is known within a distance of less than 10 microns.

5. The system of claim 1, wherein the z-axis movement of the printhead is at least one of: movement of the printhead while a printbed is stationary; and movement of the printbed while the printhead is stationary.

* * * * *